Sept. 18, 1923.   A. J. JULLIN   1,468,024
APPARATUS FOR REGULATING THE VOLTAGE OF DYNAMOS
Filed May 20, 1920

INVENTOR
ALEXIS JOSEPH JULLIN
ATTORNEY

Patented Sept. 18, 1923.

1,468,024

UNITED STATES PATENT OFFICE.

ALEXIS JOSEPH JULLIN, OF ST.-CLOUD, FRANCE.

APPARATUS FOR REGULATING THE VOLTAGE OF DYNAMOS.

Application filed May 20, 1920. Serial No. 382,922.

(GRANTED UNDER THE PROVISIONS OF THE ACT OF MARCH 3, 1921, 41 STAT. L., 1313.)

*To all whom it may concern:*

Be it known that I, ALEXIS JOSEPH JULLIN, citizen of the Republic of France, residing at 14 Rue de Garches, St.-Cloud, Seine-et-Oise, in the Republic of France, have invented new and useful Improvements in Apparatus for Regulating the Voltage of Dynamos (for which I have filed applications in France, June 9, 1914, June 16, 1914, July 28, 1914; Great Britain, October 21, 1916; Belgium, September 29, 1916; Swiss, October 16, 1916; Italy, October 3; Spain, November 6, 1916; Russia, November 2, 1916, November 15, 1916), of which the following is a specification.

This invention has for its object to provide an improved apparatus for regulating the voltage in dynamos applicable in particular to the electric lighting of railway trains and motor cars.

Experience has shown that it is possible to do away with the lamp regulator in certain equipments in which owing to a single special regulator the dynamo cannot exceed a voltage corresponding to 2.3 volts or 2.4 volts per cell of the accumulator battery when the light is in operation and can attain a voltage corresponding to about 2.6 volts per cell when the lighting is not in operation.

The apparatus forming the object of the present invention permits also of doing away with this special regulator. In this apparatus a regulating current obtained by using a resistance having a very high positive temperature coefficient, for instance, of the type of resistance composed of iron wire and known as Nernst resistances can act on the field magnets of the dynamo either directly or through a small auxiliary dynamo serving as exciting dynamo.

This exciting dynamo which can be accommodated in the body of the generator and have its armature mounted on the same shaft as that of the latter, acts in the manner of a relay and permits of using only an exceedingly small regulating current (in the order of a tenth of an ampere). It has the further advantage of making the position of the brushes fixed without the necessity of having recourse to a dynamo based on a special principle (as in the Rosenberg system).

The manner in which this invention is to be performed will now be more particularly described with reference to the accompanying drawings which illustrate by way of example one form of this invention.

In these drawings:—

Figure 1:
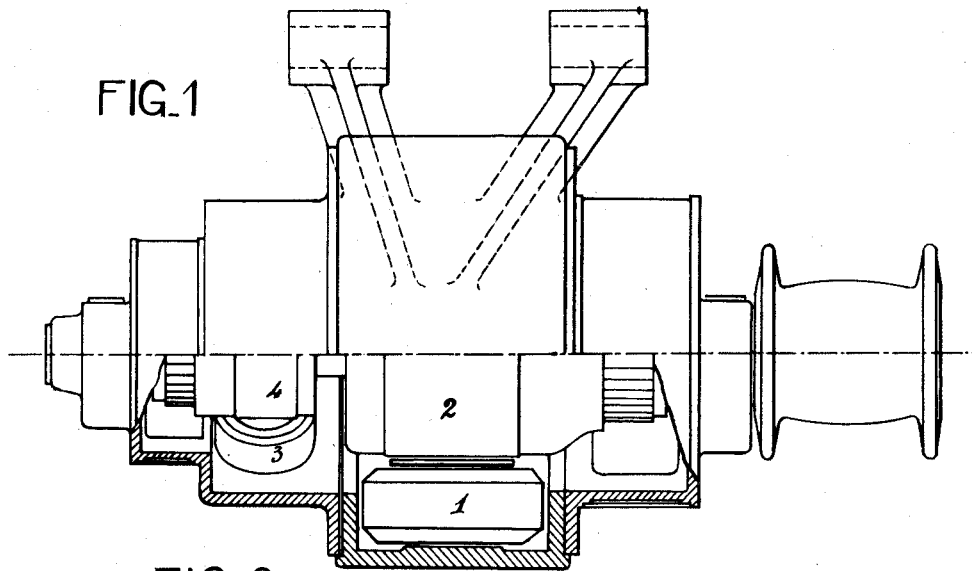
Fig. 1 is a view of a dynamo provided with an exciter.

In Figure 1, 1 are the field magnets and 2 the armature of the generator; 3 are the field magnets and 4 is the armature of the exciter. The dimensions as to space occupied by this machine are practically the same as those of dynamos with independent regulators of about the same power.

Figure 2:
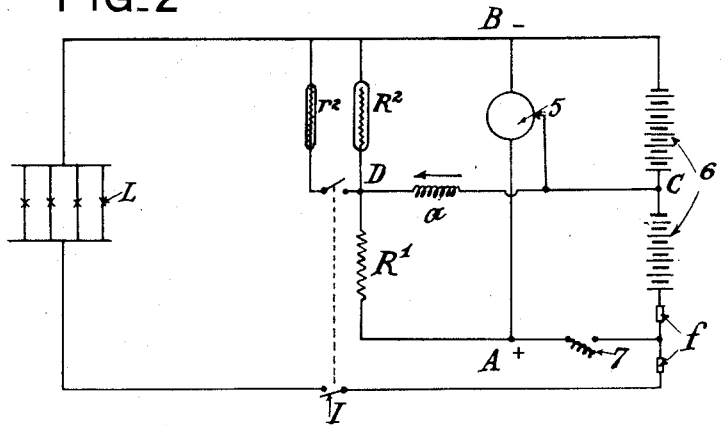
Fig. 2 is a diagram exhibiting the principle of the apparatus.
Figure 3:
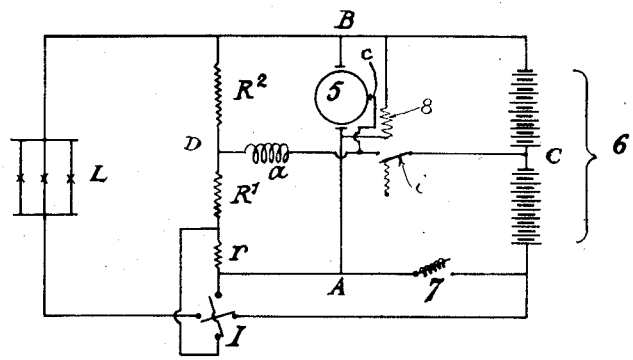
Fig. 3 is a diagrammatic view of an installation designed according to the invention.

As will be seen from Figs. 2 and 3, according to the invention the field magnet of the dynamo 5 is either directly or through an exciter subjected to the difference in potential existing between the points C and D. This point C is a point between the extreme terminals of the battery of accumulators 6, for instance, the middle of that battery (Fig. 3). The point D lies at the junction of an ordinary ohmic resistance $R^1$ and a Nernst resistance $R^2$ connected in series and together connected in parallel with the battery and the terminals A and B of the dynamo. The object of this Nernst resistance or one of a very high temperature coefficient is to keep practically constant the current in the auxiliary circuit ADB and consequently the voltage between A and D, when the voltage at the terminals of the dynamo varies, for instance, from 23 to 32 volts.

The field magnet circuit is designed in such a way that a very small potential difference between the points C and D (0.5 volts for instance) produces the necessary exciting current for the dynamo with no load and at the low speed (corresponding for instance to 25 kilometres per hour) to attain a voltage very close to that which it is desired not to exceed when running with the lighting turned on (28 volts for instance).

In the particular case corresponding to the figures indicated above as examples, the voltages between the different points A and B, A and C, D and B, A and D, C and D of the installation indicated in the diagram of Figure 2 and in particular between points C and D would vary as indicated by the table below, if the voltage at the terminals of the dynamo varied from 24 volts to 29 volts (disregarding the drops in voltage due to the resistance of the connecting conductors) and assuming that the normal current flowing in the circuit C D is very weak relatively to the current passing through the resistance $R^1$ as well as the current passing through the resistance $R^2$. In this case, the current passing in the resistance $R^1$ remains substantially equal to the current passing through the variable resistance $R^2$, since the sum of the currents converging at the point D is nil, and the current flowing in the regulating field magnet circuit $a$ is very weak. The current through the ordinary resistance $R^1$ which is of practically constant value, maintains a substantially constant voltage at the terminals of said resistance (that is to say, between the points A and D).

| A-B (Dynamo battery). | A-C C-B | D-B Nernst resistance. | A-D | C-D Regulating circuit. |
|---|---|---|---|---|
| 24 volts. | 12 volts. | 9.5 volts. | 14.5 volts. | 2.5 volts. |
| 28 volts. | 14 volts. | 13.5 volts. | 14.5 volts. | 0.5 volts. |
| 29 volts. | 14.5 volts. | 14.5 volts. | 14.5 volts. | 0.0 volts. |

Thus starting from 28 volts at the terminals of the dynamo; it will be seen that to a diminution of this voltage there corresponds a relatively very considerable increase of that at the terminals of the regulating or field circuit and consequently of the excitation. Conversely, to an increase, even very slight, of the voltage at the terminals of the dynamo, there corresponds a relatively still more considerable reduction of that at the terminals of the regulating circuit which will consequently tend to bring back the former to its initial value. This latter can never attain 29 volts whatever the speed of the dynamo because then the excitation would become nil, (apart from the remanent magnetism in the field magnets).

In the extreme case of the remanent magnetism of the field magnets of the exciter and the dynamo itself being sufficient to produce a sufficient excitation for no load running at a certain speed, the current would operate to effect its own inversion in the field magnets of this exciter if this speed were exceeded.

It should be remarked that the foregoing results are independent of the cause which may give rise to the variations of voltage at the terminals of the dynamo (variations of speed or variations of armature reaction at the various current outputs). Nevertheless when designing a machine allowance must be made for this very armature reaction in order to give it such a value that it should automatically limit the intensity of the current furnished by the dynamo after a prolonged discharge of a battery. This necessity of having a sufficiently great armature reaction is furthermore perfectly in keeping with the other necessity of having an excitation as low as possible in order to facilitate regulation and reduce at the same time the size of the machine and the expenditure of energy.

In order to increase the voltage of the dynamo above the voltage of the battery for the purpose of loading the latter during the times when the train is running without light, it will be sufficient to cut in, through the general lighting switch I, a Nernst resistance $r^2$ of suitable value in parallel with the resistance $R^2$.

For instance, if $R^2$ maintains the current flowing in the circuit ADB at an approximately constant value of say 2.5 amperes between the allowable limits of voltage at the terminals of the dynamo during normal working then $r^2$ may have such a value that it will of itself alone pass a current in the same circuit ADB at an approximately constant value equal to about 0.25 amperes between the same limits of voltage at the terminals of the dynamo. The result of cutting in the resistance $r^2$ in parallel with the resistance $R^2$ when, by operating the switch I, the working is changed from working with lighting to working without lighting, is therefore to cause the current passing through the constant resistance $R^1$ to change from 2.5 amperes, to 2.5+0.25 amperes, that is to say, to increase this current of 2.5 amperes in the proportion of $$\frac{0.25}{2.5}.$$

Consequently the voltage at the terminals of this resistance $R^1$ which was originally 14.5 volts, will be increased by $$\frac{14.5 \times 0.25}{2.5} = 1.45 \text{ volts},$$

that is to say, about 1.5 volts.

The difference of potential between C and D will thus increase by the same amount (1.5) if the difference of potential between A and C (which is one half of the foregoing) did not change; but any increase in the potential difference between C and D increases the exciting current and has the almost immediate effect of raising the voltage at the dynamo terminals, and consequently the potential difference between A and C. If the increase of this latter potential difference could reach 1.5 volts, which would be caused by an increase of voltage of 1.5×2=3 volts at the terminals of the dynamo, the potential difference between C and D, and consequently the inducing current, would become again equal to that existing previously. But as a small increase in the dynamo voltage cannot be produced at equal speeds except by a corresponding increase in the excitation; it follows that this increase in voltage will not quite reach the three volts above stated, that is to say, double the variation in voltage at the terminals of the resistance R¹.

In order to open the regulating circuit during the periods of stoppage of the dynamo, there may be provided an interrupter $i$ placed in that circuit and actuated by an electromagnet 8 in a shunt circuit to the dynamo terminals (Fig. 3) like the shunt coil of the switch 7. The returning spring of the interrupter $i$ and the electromagnet actuating said interrupter may then be regulated in order that the working of the apparatus shall be as follows:—

On starting, the exciting circuit is opened by the interrupter $i$ and the dynamo only gives the voltage due to the residual magnetism of the field magnets. At a speed slightly lower than that at which it is desired that the switch 7 shall come into operation, this voltage (a few volts) becomes sufficiently large to cause the attraction of the electromagnet 8 to overcome the force of the small opposing spring of the interrupter $i;$ the latter will therefore close. At this moment the current passes into the field magnets and the dynamo starts in order to work normally. When, after a stoppage, the voltage at the dynamo terminals has become again nil, the interrupter $i$ being pulled by its spring, opens and interrupts the passage of the current in the field magnets.

A further method for enabling the voltage at the terminals of the dynamo to be increased during the periods it is working without lighting consists in short-circuiting during the lighting periods, by means of the general lighting switch I, a part $r$ of the resistance R¹, as shown in Figure 3, and in replacing the said resistance into the circuit during the periods of total extinction. This arrangement has the advantage of replacing the auxiliary Nernst resistance $r^2$ above mentioned by the stronger ordinary resistance $r$, which is a part of R¹.

The use of the resistance R² having a very high temperature cöfficient (of iron wire) is indicated because it is at present the resistance with extremely high positive temperature coefficient which seems the best designed industrially for the particular case in view. It is evident, however, that any other resistance, with a positive temperature coefficient such that the current traversing it remains pratically constant whatever (within certain limits) the voltage at its terminals, would answer the same purpose. A resistance with a lower temperature coefficient might also be used but would only allow of regulating the voltage between wider limits. The substances such as the metals tantalum, tungsten and others generally used in the metal filaments of incandescent lamps come within this case.

On the other hand the principle itself of the automatic regulation of the dynamo voltage is based on the variation of the current in an excitation circuit subjected to the difference between a constant difference of potential (A D, D being a point in the auxiliary circuit), and a variable difference of potential (A C, C being a point in the battery or a point of the dynamo); this latter difference of potential varying within certain limits with that at the terminals of the dynamo. Therefore any device calculated to keep constant the voltage between the point A and the point D of the auxiliary circuit by means of the use of resistances having very high positive or negative temperature coefficients comes within the scope of the system.

$r$ is the auxiliary regulating resistance as described above in connection with Fig. 3, $r$ is short-circuited by means of the supplementary contacts of the general lighting switch I during the periods of running with light, and the short-circuiting of this resistance $r$ is done away with during the periods of running without lighting by the movement of the insulated blade shown in the figures at right angles to that of the main contacts.

Having now described my invention, what I claim as new and desire to secure by Letters Patent is:

1. The combination with a dynamo adapted to operate with varying speed and load and having a field magnet winding and an auxiliary brush, said field magnet winding being connected at one terminal to said auxiliary brush of a main resistance having a determined temperature coefficient and an auxiliary resistance having a different temperature coefficient connected in series and connected to the terminals of the armature of the dynamo and means for connecting the other terminal of the field magnet winding to the point of connection between the main resistance and the auxiliary resistance.

2. The combination with a dynamo adapted to operate with varying speed and load and having a field magnet winding and an auxiliary brush, said field magnet winding being connected at one terminal to said auxiliary brush and said auxiliary brush directly contacting with the commutator, of a main resistance having a determined temperature coefficient and an auxiliary resistance having a different temperature coefficient connected in series and connected to the terminals of the armature of the dynamo and means for connecting the other terminal of the field magnet winding to the point of connection between the main resistance and the auxiliary resistance.

3. The combination with a dynamo adapted to operate with varying speed and load and having a field magnet winding and an auxiliary brush, said field magnet winding being connected at one terminal to said auxiliary brush of a main resistance having a determined temperature coefficient and an auxiliary resistance having a different temperature coefficient, connected in series and connected to the terminals of the armature of the dynamo and means for connecting the other terminal of the field magnet winding to the point of connection between the main resistance and the auxiliary resistance, a lighting circuit connected to the terminals of the dynamo armature, a general lighting switch and means whereby said switch is adapted in its closed position to short circuit a part of the said auxiliary resistance in order to raise the voltage of the dynamo during the periods of running without light.

In testimony whereof I have signed my name to this specification.

ALEXIS JOSEPH JULLIN.